United States Patent
Kazmi et al.

(10) Patent No.: US 10,172,101 B2
(45) Date of Patent: Jan. 1, 2019

(54) NETWORK NODES, A WIRELESS DEVICE AND METHODS THEREIN FOR ENABLING TRANSMISSIONS IN A WIRELESS COMMUNICATIONS NETWORK

(71) Applicant: Telefonaktiebolaget LM Ericsson (publ), Stockholm (SE)

(72) Inventors: Muhammad Kazmi, Sundbyberg (SE); Chrysostomos Koutsimanis, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 8 days.

(21) Appl. No.: 15/550,245

(22) PCT Filed: Mar. 9, 2015

(86) PCT No.: PCT/SE2015/050259
§ 371 (c)(1),
(2) Date: Aug. 10, 2017

(87) PCT Pub. No.: WO2016/144216
PCT Pub. Date: Sep. 15, 2016

(65) Prior Publication Data
US 2018/0035393 A1    Feb. 1, 2018

(51) Int. Cl.
*H04W 52/34* (2009.01)
*H04W 52/50* (2009.01)
(Continued)

(52) U.S. Cl.
CPC ......... *H04W 52/346* (2013.01); *H04W 52/50* (2013.01); *H04W 52/242* (2013.01);
(Continued)

(58) Field of Classification Search
None
See application file for complete search history.

(56) References Cited

U.S. PATENT DOCUMENTS 9,838,984 B2 * 12/2017 Yang .................... H04W 52/262
9,844,085 B2 * 12/2017 Seo ........................ H04W 76/14
(Continued)

FOREIGN PATENT DOCUMENTS

| KR | 20100072892 A | 7/2010 |
|----|---------------|--------|
| WO | 2013086659 A1 | 6/2013 |
| WO | 2015038930 A1 | 3/2015 |

OTHER PUBLICATIONS

Schmidt, Robert K. et al., "Advanced Carrier Sensing to Resolve Local Channel Congestion," Proceedings of the Eighth ACM International Workshop on Vehicular Inter-networking (VANET), Sep. 23, 2011, Las Vegas, Nevada, USA, ACM, 10 pages.
(Continued)

*Primary Examiner* — Mohammed Rachedine
(74) *Attorney, Agent, or Firm* — Sage Patent Group

(57) ABSTRACT

Embodiments herein relate to a method performed by a first network node for enabling at least one second network node to perform a transmission in a wireless communications network. The first network node and the at least one second network node performs transmissions using contention-based transmission resources of the same frequency. The first network node determines an indication of a maximum transmit power for the transmission by the at least one second network node to be used by the at least one second network node when the contention-based transmission resources of the same frequency is available for transmissions by the first network node in the wireless communications network. Then, the network node transmits the determined indication of a maximum transmit power to the at least one second network node. Embodiments of the first network node are also described.

9 Claims, 4 Drawing Sheets

(51) Int. Cl.
*H04W 72/04* (2009.01)
*H04W 52/24* (2009.01)
*H04W 74/08* (2009.01)

(52) U.S. Cl.
CPC ...... *H04W 52/245* (2013.01); *H04W 72/0413* (2013.01); *H04W 72/0473* (2013.01); *H04W 74/08* (2013.01)

(56) References Cited

U.S. PATENT DOCUMENTS

| | | | |
|---|---|---|---|
| 2007/0049319 A1 | 3/2007 | Hart et al. | |
| 2009/0154617 A1* | 6/2009 | Jung | H04L 27/2662 375/345 |
| 2013/0343288 A1 | 12/2013 | Ratasuk et al. | |
| 2014/0036805 A1 | 2/2014 | Sadek et al. | |

OTHER PUBLICATIONS

International Search Report and Written Opinion for International Patent Application No. PCT/SE2015/050259, dated Dec. 16, 2015, 13 pages.
Interdigital Communications, "On design targets and supported functionality for LTE LAA", 3GPP TSG-RAN WG1#78bis, R1-144219, Ljubljana, Slovenia, Oct. 6-10, 2014, 6 pages.
Extended European Search Report for European Patent Application No. 15884805.1, dated Sep. 20, 2018, 20 pages.

* cited by examiner

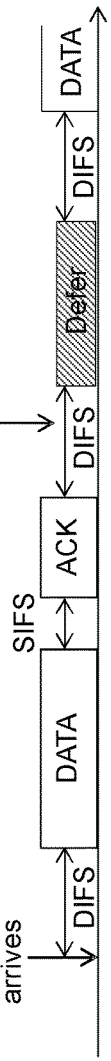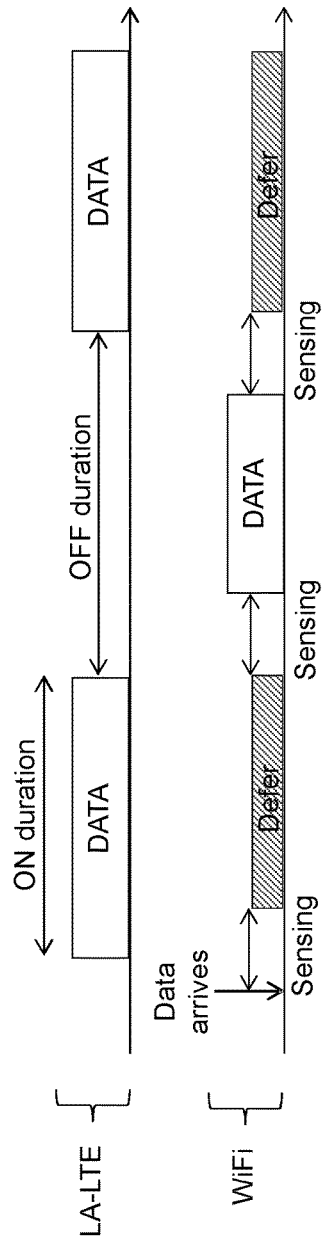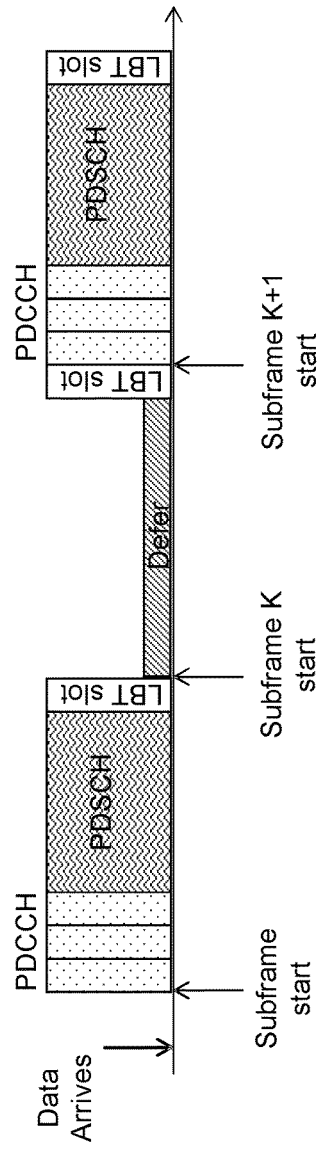
Fig. 1
Fig. 2
Fig. 3

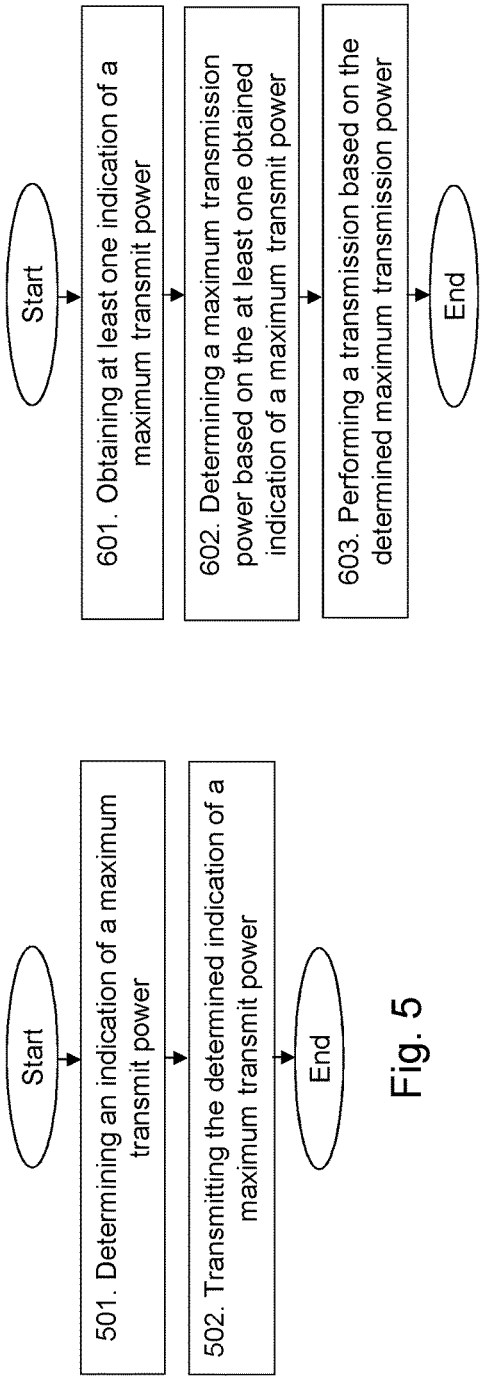
Fig. 5
Fig. 6
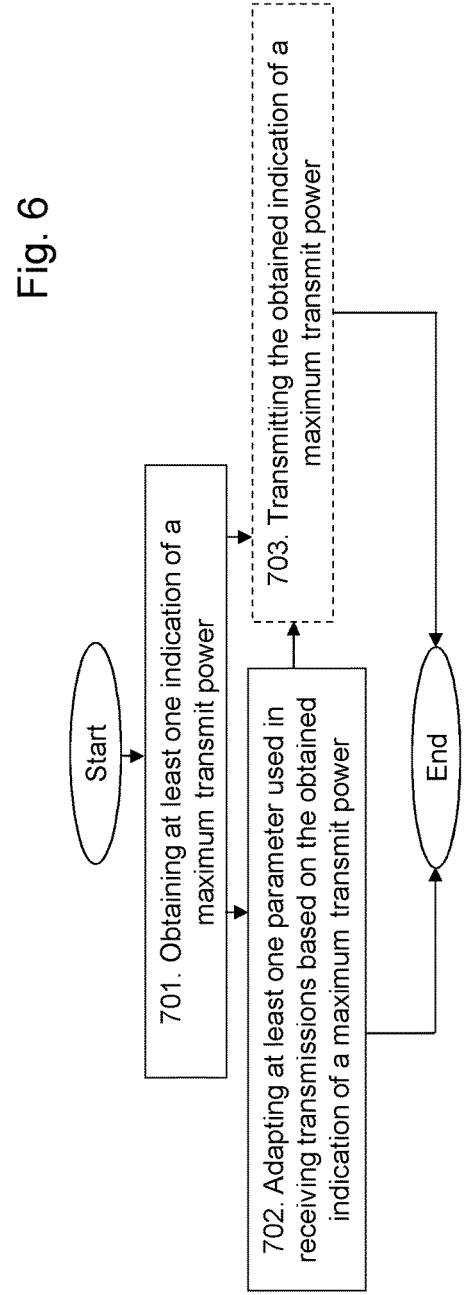
Fig. 7

NETWORK NODES, A WIRELESS DEVICE AND METHODS THEREIN FOR ENABLING TRANSMISSIONS IN A WIRELESS COMMUNICATIONS NETWORK

This application is a 35 U.S.C. § 371 national phase filing of International Application No. PCT/SE2015/050259, filed Mar. 9, 2015, the disclosure of which is incorporated herein by reference in its entirety.

TECHNICAL FIELD

Embodiments herein relate to transmissions in a wireless communications network. In particular, embodiments herein relate to network nodes, a wireless device and methods therein for enabling transmissions in a wireless communications network.

BACKGROUND

In a typical wireless, cellular or radio communications network, wireless devices, also known as mobile stations, terminals, and/or User Equipment, UEs, communicate via a Radio-Access Network, RAN, with one or more core networks. The RAN covers a geographical area which is divided into cells, with each cell being served by a base station, e.g. a radio base station, RBS, or network node, which in some networks may also be called, for example, a "NodeB", "eNodeB" or "eNB". A cell is a geographical area where radio coverage is provided by the radio base station at a base station site or an antenna site in case the antenna and the radio base station are not collocated. One radio base station may serve one or more cells.

A Universal Mobile Telecommunications System, UMTS, is a third generation mobile communication system, which evolved from the second generation, 2G, Global System for Mobile Communications, GSM. The UMTS terrestrial radio-access network, UTRAN, is essentially a RAN using wideband code-division multiple access, WCDMA, and/or High-Speed Packet Access, HSPA, to communicate with user equipment. In a forum known as the Third Generation Partnership Project, 3GPP, telecommunications suppliers propose and agree upon standards for third generation networks and UTRAN specifically, and investigate enhanced data rate and radio capacity. In some versions of the RAN, as e.g. in UMTS, several base stations may be connected, e.g., by landlines or microwave, to a controller node, such as a radio network controller, RNC, or a base station controller, BSC, which supervises and coordinates various activities of the plural base stations connected thereto. The RNCs are typically connected to one or more core networks.

Specifications for the Evolved Packet System, EPS, have been completed within the $3^{rd}$ Generation Partnership Project, 3GPP, and this work continues in the coming 3GPP releases. The EPS comprises the Evolved Universal Terrestrial Radio-Access Network, E-UTRAN, also known as the Long-Term Evolution, LTE, radio access, and the Evolved Packet Core, EPC, also known as System Architecture Evolution, SAE, core network. E-UTRAN/LTE is a variant of a 3GPP radio-access technology wherein the radio base station nodes are directly connected to the EPC core network rather than to RNCs. In general, in E-UTRAN/LTE the functions of a RNC are distributed between the radio base station nodes, e.g. eNodeBs in LTE, and the core network. As such, the Radio-Access Network, RAN, of an EPS has an essentially flat architecture comprising radio base station nodes without reporting to RNCs.

The wireless communications network described above is most commonly arranged to operate within a licensed frequency spectrum, i.e. regulated and dedicate frequency bands in which a centralized network controls the wireless or radio communication according to a certain predetermined standard. However, recent developments has opened up to expand these wireless communications networks to also operate in parts of the so-called unlicensed spectrum, i.e. unlicensed frequency bands which are shared, decentralized and not licensed to a particular type of scheduled wireless or radio communication. Examples of wireless technologies that today utilize the unlicensed spectrum may include Ultra Wideband, spread spectrum, software-defined radio, cognitive radio, and mesh networks. In the unlicensed spectrum, wireless devices of different wireless technologies compete with each other about having access to and transmitting on the transmission resources within the spectrum. Hence, the channel sharing of these transmission resources may be referred to as contention-based. To achieve a fair channel sharing of these contention-based transmission resources within the unlicensed spectrum, principles based on Carrier Sense Multiple Access/Listen-Before-Talk, CSMA/LBT, and/or Discontinuous Transmission, DTX, may be used.

The CSMA protocol is a probabilistic MAC protocol, wherein access to the channel is achieved by first sensing the channel, and then transmitting if the channel was found to be free. The principle of CSMA may also be referred to as Listen-Before-Talk, LBT, since every network node which wants to access the channel by means of transmitting data must first listen if the channel is available or not. This principle used today in WiFi networks for achieving a fair sharing of the channel. The sensing of the channel is realized by measuring the energy of the channel over a certain period of time or, in other words, by listening to the channel. If the measured energy is found to be below a predetermined threshold, then the channel is considered to be free. In this case, there is no other ongoing data transmission, which means that the channel is not used by any other nearby node. Thus, the network node that listened to the channel is able to occupy it and use it for its data transmission.

In the opposite case, where the measured energy is above the predetermined threshold then the channel is considered to be busy and the network node is not permitted to occupy the channel. In this case, the network node will instead wait, or defer, until the channel becomes available again. Typically, a random back-off counter is employed by the network node, and the network node will measure the channel until the counter expires. If the channel is found to be free during this time period, then the network node may access it. The random back-off concept is a contention mechanism which allows multiple users to measure the channel for different time periods and avoid systematic collisions. For example, it has been proven that if two network nodes employing WiFi in a WiFi network which cover the same area, then each network node will have access to the channel half, or 50%, of the time, given a heavily loaded network, i.e. a large amount of WiFi devices attempting to gain access to the WiFi network.

FIG. 1 illustrates an example of the CSMA or LBT principle in a WiFi network. Upon data arrival, a WiFi Access Point, AP, senses the channel for a period equal to Distributed Inter Frame Space, DIFS. A typical duration of the DIFS is about 34 μsec. If the channel is found to be free during this sensing or DIFS period, or in other words, the measured energy is less than a threshold, then the WiFi AP starts to transmit data to the user. An example of a typical value for the threshold is about −82 dBm. Upon successful reception of the data, the user transmits an acknowledgement message, ACK, after a period equal to Short Inter Frame Space, SIFS. A typical duration of the SIFS is about 16 μsec. After the ACK reception, or after a random back-off time, a new sensing period, or DIFS period, occur. In this example, the channel is found to be busy and the WiFi AP defers its new data transmission until the channel is found to be free again. When the channel is found to be free again, a new sensing period or DIFS period occur. If the channel is found to be free during this sensing or DIFS period, the WiFi AP starts to transmit the new data. Optionally, a random back-off timer might be added in the last DIFS to avoid simultaneous transmissions of two different deferred APs. The random back-off time is measured in units of slots with a typical value of 20 μsec.

In employing LTE in unlicensed bands, one concept builds upon Carrier Aggregation, CA, where a licensed based LTE carrier is aggregated with an unlicensed LTE carrier. In this case, the important control signaling is transmitted through the licensed LTE Component Carrier, LTE CC, and the unlicensed CC, or Secondary CC, SCC, may be used to boost the data rate. This concept is commonly referred to as License-Assisted LTE, LA-LTE, or LTE-Unlicensed, LTE-U. LA-LTE must be able to co-exist and share the channel in a fair manner with other systems deployed also on the same unlicensed frequency bands, such as, a WiFi network. LBT is one option that may be employed by an LA-LTE network in order to provide a fair sharing of the channel between different networks. Another option for the coexistence of different networks when deploying LTE in unlicensed frequency bands is DTX, as described below.

FIG. 2 shows an example of co-existence of a LA-LTE network and a WiFi network. The LA-LTE transmissions follow an ON-OFF pattern. During an ON period, the neighbouring WiFi AP defers its data transmission since it senses that the channel occupied. During an OFF period, the WiFi AP senses that the channel is free and it will transmit data. With DTX, the network node employing LA-LTE is transmitting during specific periods of time, otherwise it will remain silent. This means that the activity of the network node follows an ON-OFF pattern, where during ON periods the network node is allowed to transmit data and/or control information, and during OFF periods, the network node must remain silent. Nevertheless, in some cases, the network node may still transmit mandatory physical layer signals during the OFF periods to maintain connectivity with the user and support user measurements. An example of a DTX scheme used in LTE is the Enhanced Inter-Cell Interference Coordination, eICIC, or Almost-Blank-Subframes, ABS. Another example is the Cell-specific Reference Signal ON-OFF, CRS ON-OFF, wherein physical layer signals are not transmitted during OFF periods. The ON-OFF patterns may be configured statically, semi-statically or completely dynamic based on the available information. The ON-OFF pattern is characterized by its duration in time or periodicity and the ON ratio which is defined as the ON time divided by the total ON-OFF period. Alternatively, the ON ratio may be defined as the number of ON subframes divided by the total number of subframes. Hence, an ON ratio of 50% means that the network node is in an ON state 50% of the total time. The OFF periods, here, defer the network node from occupying the channel and thus leave the channel free for the possibility of other neighbouring nodes to access it.

FIG. 3 shows an example of LBT implemented in a network node implementing LA-LTE network. Here, a listening LBT slot is located at the end of each LTE subframe. If the channel is found to be busy during the listening LBT slot, then the network node defers from transmitting any signal, such as, e.g. data, control, physical layer signals, until the next LBT slot where the network node will re-evaluate the channel activity. For simplification, we here assume that LBT is performed periodically with a period equal to one TTI. The duration of the listening LBT slot may, for example, be in the order of tens to hundreds of μsec. Optionally, a random duration of the listening LBT slot may be employed in order to avoid systematic collisions. The listening LBT slot duration may also correspond to a fraction or up to a few LTE OFDM symbols, where each LTE OFDM symbol has duration of about 71 μsec. Hence, in this example, each LTE subframe is divided in time into two parts, where the first part carries data and the second part wherein listening takes place. The listening occurs at the end of subframe K, i.e. LBT slot, and determines whether or not data will be transmitted in the next subframe K+1.

It should however be noted that these principles, i.e. CSMA/LBT and DTX, when applied to the physical transmission layer, i.e. the Media Access Control Physical layer, MAC-PHY layer, will impose rather harsh restrictions on when in time a network node employing LA-LTE is allowed to transmit on the contention-based transmission resources. For example, when deploying prior art DTX schemes for LTE in unlicensed frequency bands, the network node is deferred from transmitting any data or control information during the OFF periods. This means that no physical layer signaling is allowed to be transmitted. This includes signaling of CRS, PSS/SSS, CSI-RS, etc. CRS ON-OFF may, for example, be employed for implementing such a DTX scheme.

One drawback of this solution is that the network node is muted for some arbitrary time which is independent of the current data traffic of any neighbouring network nodes or access point. Hence, this will have a negative impact on its performance. Furthermore, deferring transmissions of physical signals during the OFF periods might deteriorate the performance of the network. Physical signals from connected users are used in many vital operations, such as, e.g. to identify cells, to perform measurements, to execute handovers, to perform cell changes, etc. If physical signals are not transmitted properly, then many of the above operations might fail. This may lead to out-of-synch states in users and to a reduced radio link performance. This may also be worsened in case OFF periods are long or happen too often.

SUMMARY

It is an object of embodiments herein to enable transmissions in a wireless communications network which overcome at least one of the drawbacks mentioned above.

According to a first aspect of embodiments herein, the object is achieved by a method performed by first network node for enabling at least one second network node to perform a transmission in a wireless communications network. The first network node and the at least one second network node performs transmissions using contention-based transmission resources of the same frequency. The first network node determines an indication of a maximum transmit power for the transmission by the at least one second network node to be used by the at least one second network node when the contention-based transmission resources of the same frequency is available for transmissions by the first network node in the wireless communications network. Also, the network node transmits the determined indication of a maximum transmit power to the at least one second network node.

According to a second aspect of embodiments herein, the object is achieved by a first network node for enabling at least one second network node to perform a transmission in a wireless communications network. The first network node and the at least one second network node performs transmissions using contention-based transmission resources of the same frequency. The first network node comprises a processor configured to determine an indication of a maximum transmit power for the transmission by the at least one second network node to be used by the at least one 20 second network node when the contention-based transmission resources of the same frequency is available for transmissions by the first network node in the wireless communications network. The first network node also comprises a transmitter configured to transmit the determined indication of a maximum transmit power to the at least one second network node.

According to a third aspect of embodiments herein, the object is achieved by a method performed by a second network node for performing a transmission in a wireless communications network. The second network node and at least one first network node in the wireless communications network performs transmissions using contention-based transmission resources of the same frequency. The second network node obtains at least one indication of a maximum transmit power associated with the at least one first network node. Also, the second network node determines a first maximum transmission power for the transmission based on the at least one obtained indication of a maximum transmit power. Further, the second network node performs the transmission based on the first maximum transmission power when the contention-based transmission resources of the same frequency is available for transmissions by the at least one first network node in the wireless communications network.

According to a fourth aspect of embodiments herein, the object is achieved by a second network node for performing a transmission in a wireless communications network. The second network node and at least one first network node in the wireless communications network performs transmissions using contention-based transmission resources of the same frequency. The second network node comprises a processor configured to obtain at least one indication of a maximum transmit power associated with the at least one first network node, determine a first maximum transmission power for the transmission based on the at least one obtained indication of a maximum transmit power, and perform the transmission based on the first maximum transmission power when the contention-based transmission resources of the same frequency is available for transmissions by the at least one first network node in the wireless communications network.

According to a fifth aspect of embodiments herein, the object is achieved by a method performed by a first wireless device for enabling a second network node in a wireless communications network to perform a transmission to the first wireless device. The second network node and at least one first network node in the wireless communications network performs transmissions using contention-based transmission resources of the same frequency. The first wireless device obtains at least one indication of a maximum transmit power associated with the at least one first network node. Also, the first wireless device adapts at least one parameter in the first wireless device used in receiving transmissions from the second network node based on the at least one obtained indication of a maximum transmit power.

According to a sixth aspect of embodiments herein, the object is achieved by a first wireless device for enabling a second network node in a wireless communications network to perform a transmission to the first wireless device. The second network node and at least one first network node in the wireless communications network performs transmissions using contention-based transmission resources of the same frequency. The first wireless device comprises a processor configured to obtain at least one indication of a maximum transmit power associated with the at least one first network node, and adapt at least one parameter in the first wireless device used in receiving transmissions from the second network node based on the at least one obtained indication of a maximum transmit power.

According to a seventh aspect of embodiments herein, the object is achieved by a computer program, comprising instructions which, when executed on at least one processor, cause the at least one processor to carry out the method described above. According to an eight aspect of embodiments herein, the object is achieved by a carrier containing the computer program described above, wherein the carrier is one of an electronic signal, optical signal, radio signal, or computer readable storage medium.

By determining and transmitting an indication of a maximum transmit power from a first network node to a second network node, the second network node is enabled to transmit on the contention-based resources even though the contention-based resources are not available to it for transmitting data. In other words, the first network node allows the second network node to transmit data on its available contention-based transmission resources by adapting the transmission power of the second network nodes data transmissions such that they do not disturb or interfere with the first network nodes own data transmissions on its available contention-based transmission resources.

This means that the second network node is capable of, for example, transmitting critical information, such as, physical layer signals or other signals critical to maintain the connection and quality of the radio link, independent of the activity on the channel of the contention-based transmission resources. Also, an improved utilization of the available power and physical layer resources will also be achieved, since the second network node is able to simultaneously use the transmission resources without disturbing either the fair sharing of the channel or the performance of data transmissions by the first network node.

Hence, transmissions are enabled in the wireless communications network which overcomes at least one of the drawbacks mentioned above.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIG. 1 is a schematic block diagram illustrating a CSMA/LBT operation for a WiFi network, FIG. 2 is another schematic block diagram illustrating a simultaneous DTX operation for a LA-LTE network and CSMA/LBT operation for a WiFi network, FIG. 3 is a further schematic block diagram illustrating a LBT operation for a LA-LTE network, FIG. 5 is a flowchart depicting embodiments of a method in a first network node, FIG. 6 is a flowchart depicting embodiments of a method in a second network node, FIG. 7 is a flowchart depicting embodiments of a method in a first wireless device.

DETAILED DESCRIPTION

Figure 4:
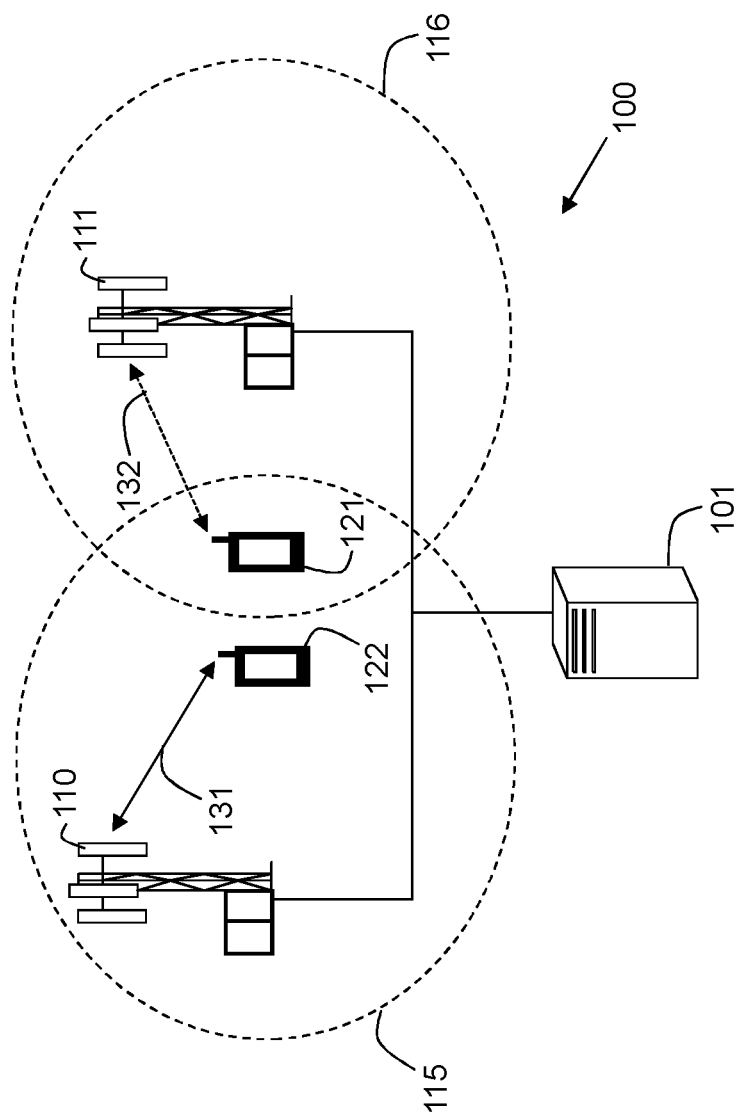
FIG. 4 is a schematic block diagram illustrating embodiments of a first network node, a second network node and a first wireless device in a wireless communications network.

The figures are schematic and simplified for clarity, and they merely show details which are essential to the understanding of the embodiments presented herein, while other details have been left out. Throughout, the same reference numerals are used for identical or corresponding parts or steps.

FIG. 4 shows an example of a wireless communications network 100 in which embodiments herein may be implemented. Although illustrated in FIG. 1 as an LTE network, the wireless communications network 100 may be any wireless or radio communication system, such as, LTE-Advanced, Wideband Code-Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM network, or other cellular network or system.

The wireless communications network 100 comprises a first network node 110 and a second network node 111. The first and second network nodes 110, 111 may e.g. be an eNB, eNodeB, or a Home Node B, a Home eNode B, femto Base Station (BS), pico BS or any other network unit capable to serve a wireless device in the wireless communications network 100. The network node 110 may also be e.g. a radio base station, a base station controller, a network controller, a relay node, a repeater, an access point, a radio access point, a wireless access point, a Ultra-Dense Network/Software-Defined Network (UDN/SDN) radio access node, a Remote Radio Unit (RRU) or a Remote Radio Head (RRH). In some embodiments, the first network node 110 may be a WiFi Access Point (AP) or another type of access point utilizing an unlicensed spectrum. Furthermore, the first and second network nodes 110, 111 each comprises multiple antennas for wireless radio communication with wireless devices located within their coverage range; that is, the first and second network nodes 110, 111 may use one or more of its respective antennas to provide radio coverage within its respective cell 115, 116. The first and second network nodes 110, 111 may be arranged to communicate directly with each other, e.g. via L2 signaling, and/or via a core network node 101. It should be noted that the core network node 101 is capable of performing, and may be arranged to perform, some or all actions described in the embodiments of the first and second network nodes 110, 111 herein. The core network node 101 may e.g. a Mobility Management Entity (MME), a Self-Organizing Network (SON) node, an Operational and Maintenance (O&M) node, an Operational Support Systems (OSS) node, a positioning node, a Enhanced Serving Mobile Location Center (E-SMLC) node, etc.

In the example of FIG. 4, a first and second wireless device 121, 122 are located within the wireless communications network 100. The first and second wireless device 121, 122 may e.g. be any kind of wireless device such as a mobile phone, a cellular phone, a Personal Digital Assistant (PDA), a smart phone, a tablet, a sensor or actuator with wireless communication capabilities, a sensor or actuator connected to or equipped with a wireless device, a Machine Device (MD), a Machine-Type-Communication (MTC) device, a Machine-to-Machine (M2M) communication device, D2D capability, a wireless device with D2D capability, a Customer-Premises Equipment (CPE), a Laptop-Mounted Equipment (LME), a Laptop-Embedded Equipment (LEE), etc.

The first and second wireless device 121, 122 are capable of, and may be configured to, transmit and receive transmissions from the first and second network nodes 110, 111 using contention-based transmission resources of the same frequency. In other words, since the first and second network nodes 110, 111 may simultaneously attempt to gain access to the transmission resources, and thus be said to compete with each other as regards who is allowed to transmit on the transmission resources and when.

According to one example, the transmission resources may be part of the so-called unlicensed spectrum or unlicensed frequency bands, i.e. parts of the frequency spectrum that is shared, decentralized and not licensed to a particular type of wireless or radio communication. In other words, the first and second wireless device 121, 122 may share the same part or portion of the spectrum in an unlicensed frequency band. The spectrum may herein interchangeably be referred to as channel, radio channel, radio frequency resource, carrier frequency, carrier, frequency layer, etc.

Furthermore, although embodiments below are described for the sake of clarity with reference to the scenario of FIG. 4, this scenario should not be construed as limiting to the embodiments herein, but merely as an example made for illustrative purposes.

For example, in the scenario shown in the example of FIG. 4, the first and second network node 110, 111 may operate on a first carrier frequency, f1, which belong to the same unlicensed spectrum. For example, the first and second network node 110, 111 may have the same channel number, e.g. ARFCN. However, embodiments described herein are also applicable to a scenario wherein the first and second network node 110, 111 operate using multiple carriers, e.g. f1, f2, . . . , fn, wherein n is any number. In this case, embodiments herein may apply the adaptation of the maximum transmission power on each carrier frequency independently or jointly for a group of carriers or jointly for all carriers.

In the scenario shown in the example of FIG. 4, the first wireless device 121 is currently located within the cell 116 being served by the second network node 122, and the second wireless device 122 is currently located within the cell 115 being served by the first network node 121. Conventionally, in this scenario and as described in the background above, only one of the first and second network nodes 110, 111 will be allocated the contention-based transmission resources of the same frequency at a specific point in time, since otherwise the simultaneous transmissions would interfere with each other.

It should be understood that the term "transmission resource" is a non-limiting term which means a specific part of the time-frequency spectrum during which a radio signal may be transmitted over said frequency. Examples of such a transmission resource is a time slot, subframe, symbol, frame, group of time slots, group of symbols, group of subframes, group of frames, group of frames, etc. Each transmission resource also comprises an LBT time slot during which a network node detects the activity on the channel. The LBT slot may be of variable duration and is also commonly located at the end of the transmission resource. It should further be understood that the term "reference signal", or RS, is a non-limiting term used to denote any type of physical signal. Examples of such a RS are CRS, PSS/SSS, DRS, CSI-RS, MBSFN RS, etc. The RS are used by wireless devices for performing one or more radio measurements, such as, for example, RSRP, RSRQ, path loss, path gain, etc.

Example of embodiments of a method performed by a first network node 110 for enabling at least one second network node 111 to perform a transmission in a wireless communications network 100, will now be described with reference to the flowchart depicted in FIG. 5. In the wireless communications network 100, the first network node 110 and the at least one second network node 111 performs transmissions using contention-based transmission resources of the same frequency. FIG. 5 illustrates an example of actions or operations which may be taken by the first network node 110. The method may comprise the following actions.

Action 501

The first network node 110 determines an indication of a maximum transmit power for the transmission by the at least one second network node 111 to be used by the at least one second network node 111 when the contention-based transmission resources of the same frequency is available for transmissions by the first network node 110 in the wireless communications network 100.

This means, for example, that the first network node 110 will, if the second network node 111 adheres to the determined maximum transmit power or cap, allow the second network node 111 to transmit data to the first wireless device 121 on contention-based transmission resources available to the first network node 110. The determined maximum transmit power or cap is determined such that data transmissions by the second network node 111 will not disturb or interfere with data transmissions from the first network node 110 to the second wireless device 122 on the contention-based transmission resources available to the first network node 110. The determined cap or maximum transmit power is denoted as $P_{cap2}$ in the following.

It should be noted that the contention-based transmission resources of the same frequency may be considered available for transmissions by the first network node 110 when the first network node 110 detects a received power level of transmissions from the second network node 110 on the carrier of the same frequency that is below a received power level threshold. In other words, the first network node 110 is the network node that has won the contention for the transmission resources, e.g. by means of measuring or sensing that there is no activity on the channel, and thus allowed to access and use the channel. In this case, the second network node 111 may, for example, be a network node in an OFF state of a DTX scheme, or a network node that is deferring its data transmission in case an LBT scheme is used.

In some embodiments, the first network node 110 may determine the indication of a maximum transmit power as a received power level threshold which is used in the first network node 110 for detecting if the contention-based transmission resources of the same frequency is available for transmissions by the first network node 110. This means that the first network node 110 may use a threshold level, which it uses to determine whether or not there is any activity on the contention-based transmission resources, as the maximum transmit power for the second network node 111. This threshold level or value may also be referred to as a threshold level for received power, sensing threshold or LBT threshold. The threshold value is denoted $P_{sens2}$ in the following. It should be noted that this parameter is available in the first network node 110, for example, as a LBT threshold which determines the activity of the channel, that is, if the amount of detected energy on the contention-based resources is lower than $P_{sens2}$, then the channel is assumed to be free and available to the first network node.

In some embodiments, the first network node 110 may determine the indication of a maximum transmit power as a path loss or signal strength value based on signal strength measurements of transmissions from the at least one second network node 111. For example, by performing signal strength measurements, e.g. Reference Signal Received Power, RSRP, measurements, on signals from the second network node 111, the first network node 110 may determine a path loss or signal strength value that is indicative of the range or inter-site distance between the first network node 110 and the second network node 111. The path loss or signal strength value is denoted $PL_{12}$ in the following. For example, during sensing or listening periods of a LBT scheme, the first and second network node 110, 111 may transmit Reference Signals, RS. Thus, the first network node 110 may estimate the path loss between the first and second network node 110, 111 by measuring RSRP on the RS transmitted by first network node 110, acquiring RS transmit power, PRS, by reading the system information present in the first network node 110 and estimate the path loss, $PL_{12}$, by using e.g. Eq. 1:

$$PL_{12} = PRS - RSRP \text{ [dB]} \quad \text{(Eq. 1)}$$

In some embodiments, the first network node 110 may determine the indication of a maximum transmit power as value corresponding to the received amount of energy for the time period during which the first network node 110 detects if the contention-based transmission resources of the same frequency is allowed for transmissions by the first network node 110. This means that the first network node 110 may determine the received amount of energy for a time-duration, $\Delta_T$. This time-duration may correspond to the time period over which the first network node 110 listens to or senses the channel. In case the first network node 110 is a WFi AP, the time-duration may correspond to a DIFS period. In case of the first network node 110 is an LTE network node, the time-duration may correspond the duration of an LBT slot, as shown and described with reference to FIG. 3. In this case, the time-duration, $\Delta_T$, may be set in the first network node 110 as part of its LBT configuration. The maximum transmit power of the second network node 111 should then not exceed the value that produces more received energy during the time-duration $\Delta_T$ than the threshold $P_{sens2}$ at the first network node 110.

In some embodiments, the first network node 110 may determine the indication of a maximum transmit power as information indicating that the second network node 111 is to use a maximum transmit power value for the first network node 110 that is determined in the second network node 111. This means that the first network node 110 may indicate to the second network node 111 to use a threshold level or value for the maximum transmit power that is present in the second network node 111.

Based on one or more of the above-mentioned embodiments, the first network node 110 may determine $P_{cap2}$ value to be used by the second network node 111. This may be performed according to any of the functions, g, expressed in Eq. 2-7:

$$P_{cap2} = g(P_{sens2}, PL_{12}) \quad \text{(Eq. 2)}$$

$$P_{cap2} = g(P_{sens2}, \Delta\tau, PL_{12}) \quad \text{(Eq. 3)}$$

$$P_{cap2} = g(P_{sens2}, \Delta\tau, PL_{12}, \beta) \quad \text{(Eq. 4)}$$

wherein in Eq. 4, 'β' may be a parameter to account for a margin of a specific implementation.

One example of the function g in Eq. 3 to determine $P_{cap2}$ is expressed in Eq. 5:

$$P_{cap2} = \frac{P_{sens2} \cdot \Delta\tau}{PL_{12}} \quad \text{(Eq. 5)}$$

One example of the function g in Eq. 4 to determine $P_{cap2}$ is expressed in Eq. 6:

$$P_{cap2} = \frac{P_{sens2} \cdot \Delta\tau, \beta}{PL_{12}} \quad \text{(Eq. 6)}$$

According to some embodiments, the functions in Eq. 5-6 may be used to determine $P_{cap2}$ based on the following constraint in Eq. 7:

$$\frac{P_{tx1} \cdot PL_{12}}{\Delta\tau} \leq P_{sens2} \quad \text{(Eq. 7)}$$

wherein $P_{tx1}$ is the maximum transmit power of the second network node 111.

In some embodiments, when determining the indication of a maximum transmit power, the first network node 110 may also adjust the determined indication of a maximum transmit power according to a correction factor. This means that the first network node 110 may apply a correction factor to the determine $P_{cap2}$. This may be performed in order to protect wireless devices being served by the first network node 110, but which are close to the second network node 111. The correction factor is denoted ΔP, and may have a positive or negative value.

According to one example, the first network node 110 may determine the correction factor to be used based on the number of wireless devices being served by the first network node 110 in the wireless communication network 100 that are currently located close to the second network node 111 according to signal measurements obtained by the first network node 110 from the wireless devices. According to another example, the first network node 110 may determine the correction factor to be used based on one or more signal quality values of transmissions from the first network node 110 to one or more wireless devices being served by the first network node 110 in the wireless communication network 100. The one or more signal quality values may, for example, be a RSRQ value, SINR value, HARQ performance value, etc., of one or more wireless devices, such as, e.g. the second wireless device 122, being served by the first network node 110.

Alternatively, according to a further example, the first network node 110 may determine the correction factor to be used based on a determined correction value of the maximum transmit value that is set in the first network node 110 or obtained by the first network node 110 from another network node in the wireless communications network 100. The network node may, for example, be determined in and obtained from the core network node 101 in the wireless communications network 100.

Based on one or more of the above mentioned embodiments, the first network node 110 may determine the correction factor ΔP and the effective $P_{cap2}$, i.e. denoted $P_{cap2,eff}$, to be used by the second network node 111. This may, for example, be performed according to any of Eq. 8-9:

$$P_{cap2,eff} = P_{cap2} + \Delta P \quad \text{(Eq. 8)}$$

$$P_{cap2,eff} = P_{cap2} + \delta \cdot \Delta P \quad \text{(Eq. 9)}$$

wherein, in Eq. 9, 'δ' may be a parameter to account for a margin of a specific implementation.

Action 502

After determining the indication of a maximum transmit power as described in Action 501, the first network node 110 transmits the determined indication of a maximum transmit power to the at least one second network node 111. This means that the first network node 110 may directly or indirectly signal the relevant information indicating the determined value of $P_{cap2}$ to the second network node 111. This may be performed by the first network node 110 in a number of ways depending on the coordination capabilities and interfaces between the first and the second network node 110, 111.

In some embodiments, when transmitting the determined indication of a maximum transmit power to the at least one second network node 111 or another network node 101, the first network node 110 may perform the transmission by broadcasting the determined indication of a maximum transmit power as part of system information. For example, the first network node 110 may broadcast the relevant information as part of a System Information Block, SIB, of a System Information, SI, signal or any other system information signal. The second network node 111 may thus receive and read the SI of the first network node 110 to acquire the maximum transmit power, i.e. $P_{cap2}$.

Alternatively, in some embodiments, the first network node 110 may perform the transmission by transmitting the determined indication of a maximum transmit power to the at least one second network node 111 or another network node 101 using dedicated signalling. For example, the first network node 110 may signal the information to the second network node 111 through dedicated signaling over an inter-node standardized interface, such as, e.g. an X2 interface in case both the first and second network node 110, 111 are LTE network nodes. Alternatively, the first network node 110 may signal the information to the second network node 111 via another network node, such as, e.g. a core network node 101 which, for example, may be a MME node, an O&M node, an OSS node, a SON node, etc.

Furthermore, in some embodiments, the first network node 110 may perform the transmission by transmitting the determined indication of a maximum transmit power to at least one wireless device 121 using dedicated signalling. This means that the first network node 110 may request one or more wireless devices being served by the first network node 110, e.g. wireless device 122, or one or more wireless devices being served by the second network node 111, e.g. wireless device 121, to read the SI of the first network node 110, e.g. on a downlink channel on a broadcast channel, to acquire the indication of the maximum transmit power, e.g.

$P_{cap2}$, and signal the acquired the indication of the maximum transmit power, e.g. $P_{cap2}$, to the second network node 111. Alternatively, the first network node 110 may signal the maximum transmit power, i.e. $P_{cap2}$, directly to the wireless device 121 on a dedicated channel, such as, e.g. PDSCH.

Example of embodiments of a method performed by a second network node 111 for performing a transmission in a wireless communications network 100, will now be described with reference to the flowchart depicted in FIG. 6. In the wireless communications network 100, the second network node 111 and at least one first network node 110 in the wireless communications network 100 performs transmissions using contention-based transmission resources of the same frequency. FIG. 6 illustrates an example of actions or operations which may be taken by the second network node 111. The method may comprise the following actions.

Action 601

Initially, the second network node 111 obtains at least one indication of a maximum transmit power associated with the at least one first network node 110. In some embodiments, when obtaining the at least one indication of a maximum transmit power associated with the at least one first network node 110, this may be performed by the second network node 111 by receiving the at least one indication of a maximum transmit power as part of a broadcast of system information by the at least one first network node 110. Alternatively, in some embodiments, it may be performed by the second network node 111 by receiving the at least one indication of a maximum transmit power from the at least one first network node 110 or another network node 101 using dedicated signalling.

It may also, according to some embodiments, be performed by the second network node 111 by receiving the at least one indication of a maximum transmit power from at least one first wireless device 121 in the wireless communications network 100. For example, in case the first and second network node 110, 111 belongs to different Radio Access Technologies, RATs, then the second network node 111 of a first RAT may request one or more wireless devices being served by the second network node 111, e.g. the first wireless device 121, to perform one or more inter-RAT measurements, such as, for example, acquisition of SI, on signals transmitted by the first network node 111 of a second RAT, acquire SI of the first network node 111, and signal the acquired SI, i.e. the received indication of a maximum transmit power, e.g. $P_{cap2}$, to the second network node 111 of a first RAT.

In some embodiments, the second network node 111 may obtain multiple indications of a maximum transmit power, e.g. $P_{cap2}$, $P_{cap3}$, ..., $P_{capm}$ values, from m number of neighbouring network nodes. In this case, the second network node 111 may, for example, receive the multiple indications of a maximum transmit power either directly from respective network node or from another network node 101, i.e. a core network node, via explicit signaling.

According to another example, the second network node 111 may obtain indications that for some of the network nodes a default value in the second network node 111 should be used as the maximum transmit power value, e.g. the network nodes for which maximum transmit power values are not available, and maximum transmit power values, e.g. $P_{cap2}$, $P_{cap3}$, ..., $P_{capm}$ values, for the remaining network nodes. In this case, the second network node 111 may be informed by a network node that it will not provide a maximum transmit power value, or be pre-configured with information indicating which network nodes which will not provide a maximum transmit power value. If a network provides a maximum transmit power value, this value should be used instead of a default value for that network node.

Action 602

In response to obtaining the at least one indication in Action 601, the second network node 111 determines a first maximum transmission power for the transmission based on the at least one obtained indication of a maximum transmit power. This means, for example, that the second network node 111 utilizes the obtained or received indication of the maximum transmit power to determine the amount of transmission power that may be used by the second network node 111 without producing excessive interference to the transmissions of the first network node 110. In some embodiments, the at least one obtained indication of a maximum transmit power comprise a maximum transmit power value, i.e. $P_{cap2}$. Alternatively, in some embodiments, the at least one obtained indication of a maximum transmit power comprise information indicating that the second network node 111 is to use the first maximum transmission power determined in the second network node 111 as the indication of a maximum transmit power associated with the at least one first network node 110. This means that the second network node 111 may utilize a default value, which may also be referred to as a pre-set, pre-configured or determined value, in the second network node 111 as the maximum transmit power value for the first network node 110. For example, the default value in the second network node 111 may correspond to the lowest possible value of $P_{cap2}$ which if used by the second network node 111 as its transmission power may be tolerated or handled by the first network node 110. The term handling or tolerating the transmission power used by the second network node 111 for transmissions herein may mean that the first network node 110 is able to access the channel and transmit data to its connected users. The term handling or tolerating the transmission power used by the second network node 111 for transmissions herein may further mean that the first network node 110 is able to manage interference received from the second network node 111. The term handling or tolerating the transmission power used by the second network node 111 for transmissions herein may further mean that the first network node 110 is able to manage interference received from the second network node 111 or is able to correctly or successfully receive or decode signals in the presence of interference received from the second network node 111. The term handling or tolerating the transmission power used by the second network node 111 for transmissions herein may even further mean that one or more wireless devices served by the first network node 110, e.g. wireless device 122, are able to manage interference received from the second network node 111 or are able to correctly or successfully receive or decode signals from the first radio network node 110 in the presence of interference received from the second network node 111. The term handling or tolerating the transmission power used by the second network node 111 for transmissions herein may even further mean that the received signal quality at the first network node 110 may be maintain above a first threshold and/or the received signal qualities at the one or more wireless devices served by the first network node 110 may be maintain above a second threshold. According to another example, the default value may correspond to the lowest value of $P_{cap2}$ or an average value of $P_{cap2}$, which has been used by the second network node 111 over a determined time period.

In some embodiments, in case the second network node 111 obtains indications of a maximum transmit power associated with two or more first network nodes 110, the second network node 111 may determine a single overall indication of the first maximum transmission power based on the obtained indications of a maximum transmit power associated with the two or more first network nodes 110. This describes a scenario wherein the first network node 110 is not the only network node in the wireless communications network 100 for which the second network node 111 receives an indication of a maximum transmit power. In such a scenario, the second network node 111 may be deployed where more than one neighbouring network node share the contention-based transmission resources of the same frequency channel. In this case, the second network node 111 therefore has to detect activity of all neighbouring network nodes on that frequency channel. This means that the second network node 111 may obtain and/or receive multiple indications of a maximum transmit power, e.g. $P_{cap2}$, $P_{cap3}$, ..., $P_{capm}$ values, from m number of neighbouring network nodes, e.g. as described in Action 601. In this case, the first network node 110 may derive a single overall indication of a maximum transmit power, denoted $P_{cap\_overall}$, which takes into account all or subset of the received maximum transmit power values, e.g. $P_{cap2}$, $P_{cap3}$, ..., $P_{capm}$ values.

Alternatively, in case the second network node 111 obtains indications of a maximum transmit power associated with two or more first network nodes 110, the second network node 111 may, according to some embodiments, determine a single overall indication of a maximum transmit power based on the obtained indications of a maximum transmit power from a subset of the two or more first network nodes 110. This means that the second network node 111 may use only subset of the received maximum transmit power values, e.g. $P_{cap2}$, $P_{cap3}$, ..., $P_{capm}$ values, for deriving the single overall maximum transmit power value, $P_{cap\_overall}$, to be used for determining its maximum transmission power in the contention-based transmission resources.

According to one example, the second network node 111 may determine the subset based on a determined number of the two or more first network nodes 110 with the lowest indications of a maximum transmit power. According to another example, the second network node 111 may determine the subset based on only the two or more first network nodes 110 with an indication of a maximum transmit power that is below a determined threshold. For example, the second network node 111 may only use the received maximum transmit power values, e.g. $P_{cap2}$, $P_{cap3}$, ..., $P_{capm}$ values, which are below a threshold, e.g. 30%, of the maximum power of the second network node 111. Alternatively, according to a further example, the second network node 111 may determine the subset based on only the two or more first network nodes 110 that are located close to the second network node 111. For example, the second network node 111 may only use the received maximum transmit power values, e.g. $P_{cap2}$, $P_{cap3}$, ..., $P_{capm}$ values, of the network nodes with the lowest calculated distance from the second network node 111.

Based on one or more of the above mentioned embodiments, the second network node 111 may determine a $P_{cap\_overall}$ value to be used according to any of the functions, $f$, expressed in Eq. 10-16:

$$P_{cap\_overall} = f(Pcap2, Pcap3, \ldots, Pcapm) \quad \text{(Eq. 10)}$$

$$P_{cap\_overall} = f(Pcap2, Pcap3, \ldots, Pcapm, \alpha_2, \ldots, \alpha_m) \quad \text{(Eq. 11)}$$

wherein, in Eq. 11, '$\alpha_2 \ldots, \alpha_m$' may be a set of parameters used to account for implementation margin. As a special case, any one or more of $\alpha_2 \ldots, \alpha_m$ may be set to 1.

Non-limiting examples of the function, $f$, to derive the $P_{cap\_overall}$ value are minimum value, mean value, x:th percentile, linear average, logarithmic average, etc. Some examples are provided in Eq. 12-14:

$$P_{cap\_overall} = \text{MIN}(\alpha_2 * Pcap2, \alpha_2 * Pcap3, \ldots, \alpha_m * Pcapm) \quad \text{(Eq. 12)}$$

$$P_{cap\_overall} = \text{MEAN}(\alpha_2 * Pcap2, \alpha_3 * Pcap3, \ldots, \alpha_m * Pcapm) \quad \text{(Eq. 13)}$$

$$P_{cap\_overall} = x\text{:th percentile of } (\alpha_2 * Pcap2, \alpha_3 * Pcap3, \ldots, \alpha_m * Pcapm) \quad \text{(Eq. 14)}$$

For example, the second network node 111 may here use the $P_{cap\_overall}$ value instead of, for example, only $P_{cap2}$ for the first network node 110, for determining its maximum transmission power, $P_{tx}$, in the contention-based transmission resources.

Action 603

The second network node 111 then performs the transmission based on the first maximum transmission power when the contention-based transmission resources of the same frequency is available for transmissions by the at least one first network node 110 in the wireless communications network 100. This means that the second network node 111 may transmit using the transmission resources, such as, e.g. subframes, time slots, symbols, etc., even though these transmission resources are not available to the second network node 111, i.e. the second network node 111 has not won the contention for these transmission resources.

According to one example, if the second network node 111 detects channel activity, or detects that activity on the channel is above a threshold for a transmission resource, or determines that the second network node 111 is in an OFF state of a DTX scheme, then the second network node 111 may transmit its signals with the determined first transmission power, denoted $P_{tx}$, which is lower or equal to the maximum transmit power according to the received indication, e.g. $P_{cap2}$, from the first network node 110. Here, the first transmission power, $P_{tx}$, is the transmission power of the second network node 111 for all transmitted signals in a transmission resource, e.g. in a symbol, slot, subframe, group of subframes or frame(s), etc.

It should also be noted that, according to some embodiments, the contention-based transmission resources of the same frequency may be considered available for transmissions by the at least one first network node 110 when the second network node 111 detects a received power level of transmissions from the at least one first network node 110 on the carrier of the same frequency that is above a received power level threshold. Alternatively, the contention-based transmission resources of the same frequency may be considered available for transmissions by the at least one first network node 110 when the second network node 111 is in a non-active state according to a discontinuous reception procedure in the second network node 111.

In some embodiments, the second network node 111 may perform the transmission based on a second maximum transmission power when the contention-based transmission resources of the same frequency is available for transmissions by the second network node 111 in the wireless communications network 100. This means that if the second network node 111 detects that there is no channel activity, or detects that the activity on the channel is below a threshold for a transmission resource, or determines that the second network node 111 is in an ON state of a DTX scheme, then the second network node 111 will transmits its signal with maximum power, denoted $P_{max1}$. In other words, the second network node 111 will transmit with maximum power when it has won the contention of the transmission resources. Here, it should be noted that the second maximum transmission power is larger than the first maximum transmission power.

It should also be noted that it may also be possible for another network node, such as, the core network node 101 to derive the value of $P_{cap\_overall}$, $P_{cap\_overall,eff}$ and/or $P_{tx}$ using the above expressions and principles. The core network node 101 may then signal one or more of the derived values to the second network node 111. In this case, the second network node 111 may typically use the received values of these parameters for setting its maximum transmission power, $P_{tx}$, in the contention-based transmission resources. According to another example, the second network node 111 may use its own derived value and the received value from the core network node 101 to obtain the final value of its maximum transmission power, $P_{tx}$, in the contention-based transmission resources.

Example of embodiments of a method performed by a first wireless device 121 for enabling a second network node 111 in a wireless communications network 100 to perform a transmission to the first wireless device 121, will now be described with reference to the flowchart depicted in FIG. 7. In the wireless communications network 100, the second network node 111 and at least one first network node (110) in the wireless communications network 100 performs transmissions using contention-based transmission resources of the same frequency. FIG. 7 illustrates an example of actions or operations which may be taken by the first wireless device 121. The method may comprise the following actions.

Action 701

Initially, the first wireless device 121 obtains at least one indication of a maximum transmit power associated with the at least one first network node 110. According to some embodiments, the at least one obtained indication of maximum transmit power may be obtained by the first wireless device 121 via system information broadcasted by the at least one first network node 110 or via dedicated signalling from the at least one first network node 110 to the first wireless device 121. In some embodiments, the at least one obtained indication of a maximum transmit power comprise a maximum transmit power value. Alternatively, in some embodiments, the at least one obtained indication of a maximum transmit power comprise information indicating that the second network node 111 is to use the first maximum transmission power determined in the second network node 111 as the indication of a maximum transmit power associated with the at least one first network node 110.

It should be noted that the first wireless device 121 may or may not be served by the network node for whom the indication of maximum transmit power is to be acquired. For example, the first wireless device 121 may be served by the second network node 111 and acquire an indication of maximum transmit power for the neighbouring network nodes, such as, e.g. the first network node 110.

Action 702

In response to obtaining the at least one indication in Action 601, the first wireless device 121 adapts at least one parameter in the first wireless device 121 used in receiving transmissions from the second network node 111 based on the at least one obtained indication of a maximum transmit power.

In some embodiments, the first wireless device 121 may use the acquired indication of maximum transmit power to determine the expected maximum transmission power of its serving network node, e.g. the second network node 111. For example, the first wireless device 121 may determine the $P_{tx}$ of its serving cell 116, and/or of one or more neighbouring cells, by using any one or more of Eq. 1-16 described above.

According to some embodiments, when adapting at least one parameter in the first wireless device 121 used in receiving transmissions from the second network node 111, the first wireless device 121 first estimate a maximum transmission power for the transmission from the second network node 111 to the first wireless device 121 based on the at least one obtained indication of a maximum transmit power associated with the at least one first network node 110. Then, the first wireless device 121 may select the type of receiver to be used in the first wireless device 121 for the transmission from the second network node 111 to the first wireless device 121 based on the estimated maximum transmission power. For example, the first wireless device 121 may adjust one or more parameters of its receiver for receiving radio signals based on one or more indication of maximum transmit power, such as, e.g. $P_{cap2}$, and determined value $P_{tx}$. According to a further example, if $P_{tx}$ is below a determined threshold, then the first wireless device 121 may use multiple receiving antennas for receiving the signals from serving and/or neighbouring cell, i.e. signal from the first and/or second network node 110, 111.

Action 703

Optionally, the first wireless device 121 may transmit the at least one obtained indication of a maximum transmit power to the second network node 111 or another network node 101 in the wireless communications network 100. In some embodiments, the first wireless device 121 may store one or more of: the maximum transmit power value, the information indicating that the second network node 111 is to use a maximum transmit power value for the at least one first network node 110 determined in the second network node 111 as the indication of a maximum transmit power associated with the at least one first network node 110, and/or the expected maximum transmission power for the transmission from the second network node 111 to the first wireless device 121. This may be performed by the first wireless device 121 in order to collect and signal transmission statistics to the second network node 111.

Figure 8:
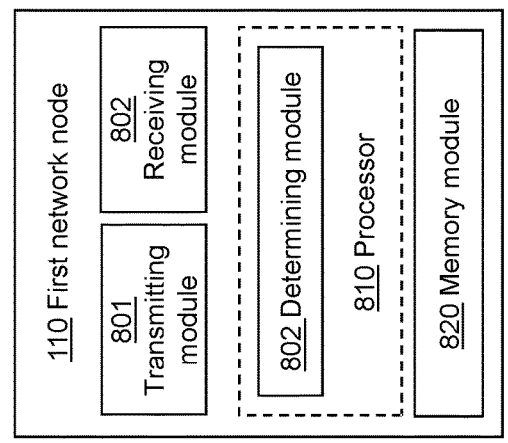
FIG. 8 is a schematic block diagram depicting embodiments of a first network node.

To perform the method actions for enabling at least one second network node 111 to perform a transmission in a wireless communications network 100, the first network node 110 may comprise the following arrangement depicted in FIG. 8. In the wireless communications network 100, the first network node 110 and the at least one second network node 111 performs transmissions using contention-based transmission resources of the same frequency.

FIG. 8 shows a schematic block diagram of embodiments of the first network node 110. In some embodiments, the first network node 110 may comprise a receiving module 801, a transmitting module 802, and a processor 810. The receiving module 801 may also be referred to as a receiver or receiving unit, and the transmitting module 802 may also be referred to as transmitter or transmitting unit.

The processor 810 may also be referred to as processing module, processing unit or processing circuitry. The processor 810 is configured to, or a determining module 811 in the first network node 110 is configured to, determine an indication of a maximum transmit power for the transmission by the at least one second network node 111 to be used by the at least one second network node 111 when the contention-based transmission resources of the same frequency is available for transmissions by the first network node 110 in the wireless communications network 100. The processor 810 also controls the receiver 801 and the transmitter 802. Optionally, the processor 810 may be said to comprise one or more of the receiver 801 and the transmitter 802, and/or perform the function thereof as described below. Also, the transmitter 802 is configured to transmit the determined indication of a maximum transmit power to the at least one second network node 111.

In some embodiments, the processor 810 may be further configured to, or the determining module 811 in the first network node 110 may be further configured to, determine the indication of a maximum transmit power as a received power level threshold. The received power level threshold is used the processor 810 in the first network node 110 for detecting if the contention-based transmission resources of the same frequency is available for transmissions by the first network node 110. In some embodiments, the processor 810 may be further configured to, or the determining module 811 in the first network node 110 may be further configured to, determine the indication of a maximum transmit power as a path loss or signal strength value based on signal strength measurements of transmissions from the at least one second network node 111. In some embodiments, the processor 810 may be further configured to, or the determining module 811 in the first network node 110 may be further configured to, determine the indication of a maximum transmit power as a value corresponding to the received amount of energy for the time period during which the first network node 110 detects if the contention-based transmission resources of the same frequency is allowed for transmissions by the first network node 110. In some embodiments, the processor 810 may be further configured to, or the determining module 811 in the first network node 110 may be further configured to, determine the indication of a maximum transmit power as information indicating that the second network node 111 is to use a maximum transmit power value for the first network node 110 that is determined in the second network node 111.

In some embodiments, the processor 810 may be configured to, or the determining module 811 in the first network node 110 may be further configured to, determine the indication of a maximum transmit power by adjusting the determined indication of a maximum transmit power according to a correction factor. In this case, the processor 810 may be configured to, or the determining module 811 in the first network node 110 may be further configured to, determine the correction factor to be used based on, according to one example, the number of wireless devices being served by the first network node 110 in the wireless communication network 100 that are currently located close to the second network node 111 according to signal measurements obtained by the first network node 110 from the wireless devices. According to another example, the processor 810 may be configured to, or the determining module 811 in the first network node 110 may be further configured to, determine the correction factor to be used based on one or more signal quality values of transmissions from the first network node 110 to one or more wireless devices being served by the first network node 110 in the wireless communication network 100. Alternatively, according to a further example, the processor 810 may be configured to, or the determining module 811 in the first network node 110 may be further configured to, determine the correction factor to be used based on a determined correction value of the maximum transmit value that is set in the first network node 110 or obtained by the first network node 110 from another network node 101 in the wireless communications network 100.

The transmitter 802 may, in some embodiments, be further be configured to transmit the determined indication of a maximum transmit power to the at least one second network node 111 or another network node 101 by broadcasting the determined indication of a maximum transmit power as part of system information. Alternatively, in some embodiments, the transmitter 802 may be configured to transmit the determined indication of a maximum transmit power to the at least one second network node 111 or another network node 101 using dedicated signalling. Furthermore, the transmitter 802, in some embodiments, may be configured to transmit the determined indication of a maximum transmit power to at least one wireless device 121 using dedicated signalling.

The embodiments for enabling at least one second network node 111 to perform a transmission in a wireless communications network 100 may be implemented through one or more processors, such as, e.g. the processor 810 in the first network node 110 depicted in FIG. 8, together with computer program code for performing the functions and actions of the embodiments herein. The program code mentioned above may also be provided as a computer program product, for instance in the form of a data carrier carrying computer program code or code means for performing the embodiments herein when being loaded into the processor 810 in the first network node 110. The computer program code may e.g. be provided as pure program code in the first network node 110 or on a server and downloaded to the first network node 110. The carrier may be one of an electronic signal, optical signal, radio signal, or computer-readable storage medium, such as, e.g. electronic memories like a RAM, a ROM, a Flash memory, a magnetic tape, a CD-ROM, a DVD, a Blueray disc, etc.

The first network node 110 may further comprise a memory 820, which may be referred to or comprise one or more memory modules or units. The memory 820 may be arranged to be used to store executable instructions and data to perform the methods described herein when being executed in or by the processor 810 of the first network node 110. Those skilled in the art will also appreciate that the processor 810 and the memory 820 described above may refer to a combination of analog and digital circuits, and/or one or more processors configured with software and/or firmware, e.g. stored in the memory 820, that when executed by the one or more processors, such as, the processor 810, cause the one or more processors to perform the method as described above. The processor 810 and the memory 820 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program product, comprising instructions which, when executed on at least one processor, e.g. the processor 810, cause the at least one processor to carry out the method for enabling at least one second network node 111 to perform a transmission in a wireless communications network 100. Also, some embodiments may further comprise a carrier containing said computer program product, wherein the carrier is one of an electronic signal, optical signal, radio signal, or computer-readable storage medium.

Figure 9:
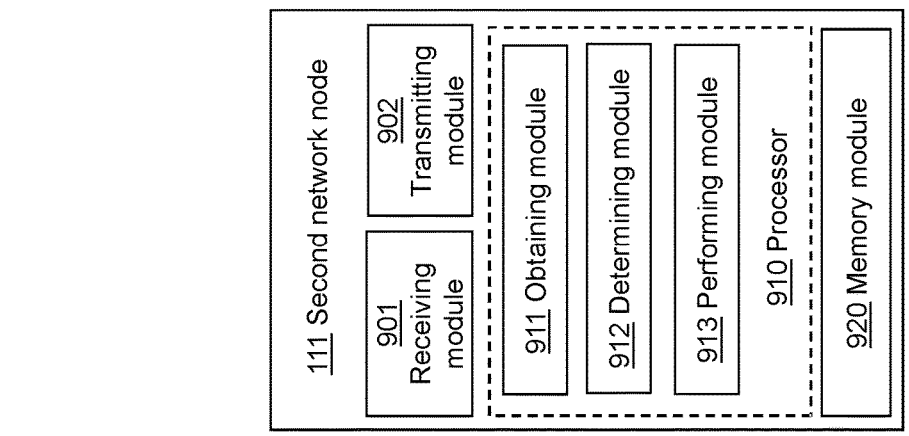
FIG. 9 is a schematic block diagram depicting embodiments of a second network node.

To perform the method actions for performing a transmission in a wireless communications network 100, the second network node 111 may comprise the following arrangement depicted in FIG. 9. In the wireless communications network 100, the second network node 111 and at least one first network node 110 performs transmissions using contention-based transmission resources of the same frequency.

FIG. 9 shows a schematic block diagram of embodiments of the second network node 111. In some embodiments, the second network node 111 may comprise a receiving module 901, a transmitting module 902, and a processor 910. The receiving module 901 may also be referred to as a receiver or receiving unit, and the transmitting module 902 may also be referred to as transmitter or transmitting unit.

The processor 910 may also be referred to as processing module, processing unit or processing circuitry. The processor 910 is configured to, or an obtaining module 911 in the second network node 111 is configured to, obtain at least one indication of a maximum transmit power associated with the at least one first network node 110. The processor 910 is also configured to, or a determining module 912 in the second network node 111 is configured to, determine a first maximum transmission power for the transmission based on the at least one obtained indication of a maximum transmit power. The processor 910 is further configured to, or a performing module 913 in the second network node 111 is configured to, perform the transmission based on the first maximum transmission power when the contention-based transmission resources of the same frequency is available for transmissions by the at least one first network node 110 in the wireless communications network 100. The processor 910 may control the receiver 901 and the transmitter 902. Optionally, the processor 910 may also comprise one or more of the receiver 901 and the transmitter 902, and/or perform the function thereof as described below.

It should be noted that, according to some embodiments, the contention-based transmission resources of the same frequency may be considered available for transmissions by the at least one first network node 110 when processor 910 in the second network node 111 detects a received power level of transmissions from the at least one first network node 110 on the carrier of the same frequency that is above a received power level threshold. Alternatively, the contention-based transmission resources of the same frequency may be considered available for transmissions by the at least one first network node 110 when the second network node 111 is in a non-active state according to a discontinuous reception procedure in the processor 910 in the second network node 111.

In some embodiments, the at least one obtained indication of a maximum transmit power comprise a maximum transmit power value. Alternatively, in some embodiments, the at least one obtained indication of a maximum transmit power comprise information indicating that the second network node 111 is to use the first maximum transmission power determined in the second network node 111 as the indication of a maximum transmit power associated with the at least one first network node 110.

In some embodiments, in case indications of a maximum transmit power associated with two or more first network nodes 110 is obtained, the processor 910 may be further configured to, or the determining module 912 in the second network node 111 may be further configured to, determine a single overall indication of the first maximum transmission power based on the obtained indications of a maximum transmit power associated with the two or more first network nodes 110. In this case, the processor 910 may be further configured to, or the determining module 912 in the second network node 111 may be further configured to, determine the single overall indication of a maximum transmit power based on the obtained indications of a maximum transmit power from a subset of the two or more first network nodes 110. The processor 910 may be further configured to, or the determining module 912 in the second network node 111 may be further configured to, determine the subset based on at least one of: a determined number of the two or more first network nodes 110 with the lowest indications of a maximum transmit power; only the two or more first network nodes 110 with an indication of a maximum transmit power that is below a determined threshold; only the two or more first network nodes 110 that are located close to the second network node 111.

In some embodiments, the processor 910 may be further configured to, or the obtaining module 911 in the second network node 111 may be further configured to, obtain the at least one indication of a maximum transmit power associated with the at least one first network node 110 by receiving, via the receiver 901, the at least one indication of a maximum transmit power as part of a broadcast of system information by the at least one first network node 110. Optionally, the processor 910 may be further configured to, or the obtaining module 911 in the second network node 111 may be further configured to, obtain the at least one indication of a maximum transmit power associated with the at least one first network node 110 by receiving, via the receiver 901, the at least one indication of a maximum transmit power from the at least one first network node 110 or another network node 101 using dedicated signalling, or the at least one indication of a maximum transmit power from at least one first wireless device 121 in the wireless communications network 100.

Furthermore, the transmitter 902 may, in some embodiments, be configured to perform the transmission based on a second maximum transmission power when the contention-based transmission resources of the same frequency is available for transmissions by the second network node 111 in the wireless communications network 100. Here, the second maximum transmission power is larger than the first maximum transmission power.

The embodiments for performing a transmission in a wireless communications network 100 may be implemented through one or more processors, such as, e.g. the processor 910 in the second network node 111 depicted in FIG. 9, together with computer program code for performing the functions and actions of the embodiments herein. The program code mentioned above may also be provided as a computer program product, for instance in the form of a data carrier carrying computer program code or code means for performing the embodiments herein when being loaded into the processor 910 in the second network node 111. The computer program code may e.g. be provided as pure program code the second network node 111 or on a server and downloaded to the second network node 111. The carrier may be one of an electronic signal, optical signal, radio signal, or computer-readable storage medium, such as, e.g. electronic memories like a RAM, a ROM, a Flash memory, a magnetic tape, a CD-ROM, a DVD, a Blueray disc, etc.

The second network node 111 may further comprise a memory 920, which may be referred to or comprise one or more memory modules or units. The memory 920 may be arranged to be used to store executable instructions and data to perform the methods described herein when being executed in or by the processor 910 of the second network node 111. Those skilled in the art will also appreciate that the processor 910 and the memory 920 described above may refer to a combination of analog and digital circuits, and/or one or more processors configured with software and/or firmware, e.g. stored in the memory 920, that when executed by the one or more processors, such as, the processor 910, cause the one or more processors to perform the method as described above. The processor 910 and the memory 920 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program product, comprising instructions which, when executed on at least one processor, e.g. the processor 910, cause the at least one processor to carry out the method for performing a transmission in a wireless communications network 100. Also, some embodiments may further comprise a carrier containing said computer program product, wherein the carrier is one of an electronic signal, optical signal, radio signal, or computer-readable storage medium.

Figure 10:
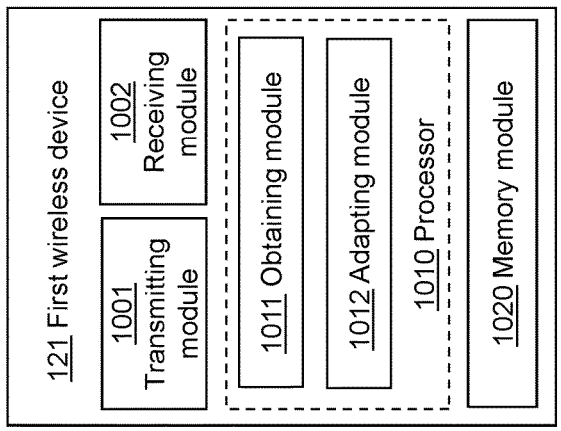
FIG. 10 is a schematic block diagram depicting embodiments of a first wireless device.

To perform the method actions for enabling a second network node 111 in a wireless communications network 100 to perform a transmission to the first wireless device 121, the first wireless device 121 may comprise the following arrangement depicted in FIG. 10. In the wireless communications network 100, the second network node 111 and at least one first network node 110 in the wireless communications network 100 performs transmissions using contention-based transmission resources of the same frequency.

FIG. 10 shows a schematic block diagram of embodiments of the first wireless device 121. In some embodiments, the first wireless device 121 may comprise a receiving module 1001, a transmitting module 1002, and a processor 1010. The receiving module 1001 may also be referred to as a receiver or receiving unit, and the transmitting module 1002 may also be referred to as transmitter or transmitting unit.

The processor 1010 may also be referred to as processing module, processing unit or processing circuitry. The processor 1010 is configured to, or an obtaining module 1011 in the first wireless device 121 is configured to, obtain at least one indication of a maximum transmit power associated with the at least one first network node 110. The processor 1010 is also configured to, or an adapting module 1012 in the first wireless device 121 is configured to, adapt at least one parameter in the first wireless device 121 used in receiving transmissions from the second network node 111 based on the at least one obtained indication of a maximum transmit power. The processor 1010 may control the receiver 1001 and the transmitter 1002. Optionally, the processor 1010 may be said to comprise one or more of the receiver 1001 and the transmitter 1002, and/or perform the function thereof as described below.

In some embodiments, the transmitter 1002 may be further configured to transmit the at least one obtained indication of a maximum transmit power to the second network node 111 or to another network node 101 in the wireless communications network 100.

In some embodiments, the processor 1010 may be further configured to, or the adapting module 1012 may be further configured to, adapt at least one parameter in the first wireless device 121 used in receiving transmissions from the second network node 111 by estimating a maximum transmission power for the transmission from the second network node 111 to the first wireless device 121 based on the at least one obtained indication of a maximum transmit power associated with the at least one first network node 110, and selecting a type of receiver to be used in the first wireless device 121 for the transmission from the second network node 111 to the first wireless device 121 based on the estimated maximum transmission power.

In some embodiments, the processor 1010 may be further configured to store one or more of: the maximum transmit power value, the information indicating that the second network node 111 is to use a maximum transmission power for the at least one first network node 110 determined in the second network node 111 as the indication of a maximum transmit power associated with the at least one first network node 110, and/or the expected maximum transmission power for the transmission from the second network node 111 to the first wireless device 121.

In some embodiments, the receiver 1001 may be further configured to, or the obtaining module 1011 may be further configured to, obtain the at least one obtained indication of maximum transmit power via system information broadcasted by the at least one first network node 110 or via dedicated signalling from the at least one first network node 110 to the first wireless device 121.

The embodiments for enabling a second network node 111 in a wireless communications network 100 to perform a transmission to the first wireless device 121 may be implemented through one or more processors, such as, e.g. the processor 1010 in the first wireless device 121 depicted in FIG. 10, together with computer program code for performing the functions and actions of the embodiments herein. The program code mentioned above may also be provided as a computer program product, for instance in the form of a data carrier carrying computer program code or code means for performing the embodiments herein when being loaded into the processor 1010 in the first wireless device 121. The computer program code may e.g. be provided as pure program code the first wireless device 121 or on a server and downloaded to the first wireless device 121. The carrier may be one of an electronic signal, optical signal, radio signal, or computer-readable storage medium, such as, e.g. electronic memories like a RAM, a ROM, a Flash memory, a magnetic tape, a CD-ROM, a DVD, a Blueray disc, etc.

The first wireless device 121 may further comprise a memory 1020, which may be referred to or comprise one or more memory modules or units. The memory 1020 may be arranged to be used to store executable instructions and data to perform the methods described herein when being executed in or by the processor 1010 of the first wireless device 121. Those skilled in the art will also appreciate that the processor 1010 and the memory 1020 described above may refer to a combination of analog and digital circuits, and/or one or more processors configured with software and/or firmware, e.g. stored in the memory 1020, that when executed by the one or more processors, such as, the processor 1010, cause the one or more processors to perform the method as described above. The processor 1010 and the memory 1020 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program product, comprising instructions which, when executed on at least one processor, e.g. the processor 1010, cause the at least one processor to carry out the method for enabling a second network node 111 in a wireless communications network 100 to perform a transmission to the first wireless device 121. Also, some embodiments may further comprise a carrier containing said computer program product, wherein the carrier is one of an electronic signal, optical signal, radio signal, or computer-readable storage medium.

The terminology used in the detailed description of the particular embodiments illustrated in the accompanying drawings is not intended to be limiting of the described network node 110, first wireless device 121 and methods therein which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

ABBREVIATIONS

BS Base Station
CID Cell Identity
CRS Cell-specific Reference Signal
CSI-RS Channel State Information Reference Signal
DAS Distributed Antenna System
DL Downlink
DMRS Demodulation Reference Signal
eICIC Enhanced Inter-Cell Interference Coordination
ICIC Inter-Cell Interference Coordination
ID Identity
L1 Layer 1
L2 Layer 2
LBT Listen Before Talk
LTE Long Term Evolution
MAC Medium Access Control
OFDM Orthogonal Frequency Division Multiplexing
PBCH Physical Broadcast Channel
PCFICH Physical Control format Indicator
PDCCH Physical Downlink Control Channel
PDSCH Physical Downlink Shared Channel
PHICH Physical Hybrid ARQ Indicator Channel
PRS Positioning reference signal
PSS Primary Synchronization Signal
RAT Radio Access Technology
RE Resource Element
RB Resource Block
RRH Remote radio head
RRM Radio Resource Management
RRU Remote radio unit
RSRQ Reference signal received quality
RSRP Reference signal received power
SFN Single Frequency Network
SRS Sounding Reference Signal
SSS Secondary Synchronization Signal
UE User Equipment
UL Uplink
RSTD Reference signal time difference
SON Self Organizing Network
RSSI Received signal strength indicator
O&M Operational and Maintenance
OSS Operational Support Systems
OTDOA Observed time difference of arrival

The invention claimed is:

1. A method performed by a second network node for performing a transmission in a wireless communications network, wherein the second network node and at least one first network node in the wireless communications network performs transmissions using contention-based transmission resources of the same frequency, the method comprising:
   obtaining indications of a maximum transmit power associated with two or more first network nodes;
   determining a single overall indication of a first maximum transmission power for the transmission based on the obtained indications of the maximum transmit power associated with the two or more first network nodes; and
   performing the transmission based on the first maximum transmission power when the contention-based transmission resources of the same frequency is available for transmissions by the at least one first network node in the wireless communications network.

2. The method according to claim 1, wherein the at least one obtained indication of the maximum transmit power comprise a maximum transmit power value, or information indicating that the second network node is to use the first maximum transmission power determined in the second network node as the indication of a maximum transmit power associated with the at least one first network node.

3. A second network node for performing a transmission in a wireless communications network, wherein the second network node and at least one first network node in the wireless communications network performs transmissions using contention-based transmission resources of the same frequency, the second network node comprising:
   a processor configured to obtain indications of a maximum transmit power associated with two or more first network nodes, determine a single overall indication of a first maximum transmission power for the transmission based on the obtained indications of a maximum transmit power associated with the two or more first network nodes, and perform the transmission based on the first maximum transmission power when the contention-based transmission resources of the same frequency is available for transmissions by the at least one first network node in the wireless communications network.

4. The method according to claim 3, wherein the at least one obtained indication of a maximum transmit power comprise a maximum transmit power value, or information indicating that the second network node is to use the first maximum transmission power determined in the second network node as the indication of a maximum transmit power associated with the at least one first network node.

5. The second network node according to claim 3, further comprising a memory, wherein said memory is containing instructions executable by said processor.

6. A method performed by a first wireless device for enabling a second network node in a wireless communications network to perform a transmission to the first wireless device, wherein the second network node and at least one first network node in the wireless communications network performs transmissions using contention-based transmission resources of the same frequency, the method comprising:
   obtaining indications of a maximum transmit power associated with two or more first network nodes; and
   adapting at least one parameter in the first wireless device used in receiving transmissions from the second network node based on the obtained indications of a maximum transmit power associated with the two or more first network nodes.

7. The method according to claim 6, wherein the at least one obtained indication of a maximum transmit power comprise a maximum transmit power value, or information indicating that the second network node is to use a maximum transmission power determined in the second network node as the indication of a maximum transmit power associated with the at least one first network node.

8. A first wireless device for enabling a second network node in a wireless communications network to perform a transmission to the first wireless device, wherein the second network node and at least one first network node in the wireless communications network performs transmissions using contention-based transmission resources of the same frequency, the first wireless device comprising:
   a processor configured to obtain indications of a maximum transmit power associated with two or more first network nodes, and adapt at least one parameter in the first wireless device used in receiving transmissions from the second network node based on the obtained indications of a maximum transmit power associated with the two or more first network nodes.

9. The first wireless device according to claim 8, further comprising a memory, wherein said memory is containing instructions executable by said processor.

* * * * *